(12) United States Patent
Kent et al.

(10) Patent No.: US 6,446,857 B1
(45) Date of Patent: Sep. 10, 2002

(54) METHOD FOR BRAZING FITTINGS TO PIPES

(75) Inventors: Scott E. Kent, Albion; David A. Southwick, Lockport, both of NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/871,178

(22) Filed: May 31, 2001

(51) Int. Cl.[7] .................. B23K 31/02; B21D 39/20; F16L 13/08; F16L 21/00
(52) U.S. Cl. .................. 228/139; 228/168; 228/246; 285/289.5; 285/417
(58) Field of Search .................. 228/135, 136, 228/139, 164, 165, 168, 246; 285/136.1, 289.5, 417

(56) References Cited

U.S. PATENT DOCUMENTS

| | | | |
|---|---|---|---|
| 3,704,035 A | * | 11/1972 | Mayer |
| 3,971,500 A | * | 7/1976 | Kushner et al. |
| 4,144,404 A | * | 3/1979 | De Groef et al. |
| 4,198,081 A | * | 4/1980 | Harrison et al. |
| 4,280,721 A | * | 7/1981 | Narkon |
| 4,560,189 A | * | 12/1985 | Lang et al. |
| 4,570,600 A | * | 2/1986 | Atkins et al. |
| 4,664,421 A | * | 5/1987 | Jones |
| 4,697,831 A | * | 10/1987 | Thalmann |
| 4,712,812 A | * | 12/1987 | Weir, III |
| 4,733,890 A | * | 3/1988 | Vyse |
| 4,739,916 A | * | 4/1988 | Ayres et al. |
| 5,333,918 A | * | 8/1994 | Crout et al. |
| 5,378,074 A | * | 1/1995 | Blouin et al. |
| 5,403,014 A | * | 4/1995 | Merkel et al. |
| 5,487,573 A | * | 1/1996 | Panek et al. |
| 5,490,680 A | * | 2/1996 | Patel et al. |
| 6,264,062 B1 | * | 7/2001 | Lack et al. |

FOREIGN PATENT DOCUMENTS

JP          50011958 A  *  2/1975

* cited by examiner

Primary Examiner—Tom Dunn
Assistant Examiner—Kiley Stoner
(74) Attorney, Agent, or Firm—Patrick M. Griffin

(57) ABSTRACT

There is provided a process that includes providing an extruded fitting having a bore formed therein. The bore is machined from one or both sides of the extruded fitting to provide a ledge on one side for interacting with a corresponding fitting and a stop on the other. A pipe and braze sleeve are placed in combination into the bore and engage the stop. The pipe and bore include anti-rotation and location irregularities formed thereon to maintain a desired orientation of the parts. A mandrel is used to deform the pipe and sleeve to the shape of the bore. The parts are then brazed in a furnace.

30 Claims, 4 Drawing Sheets

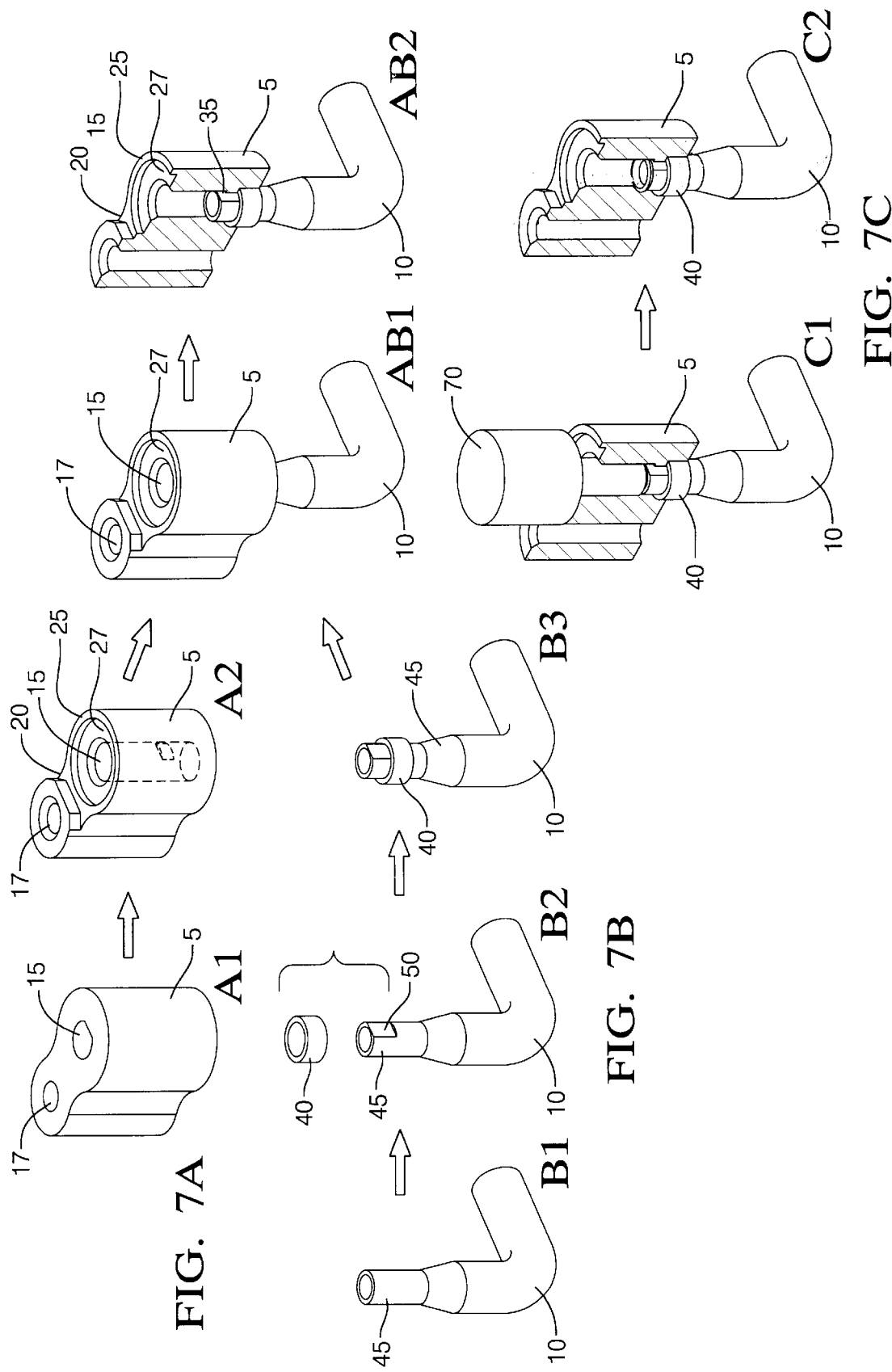

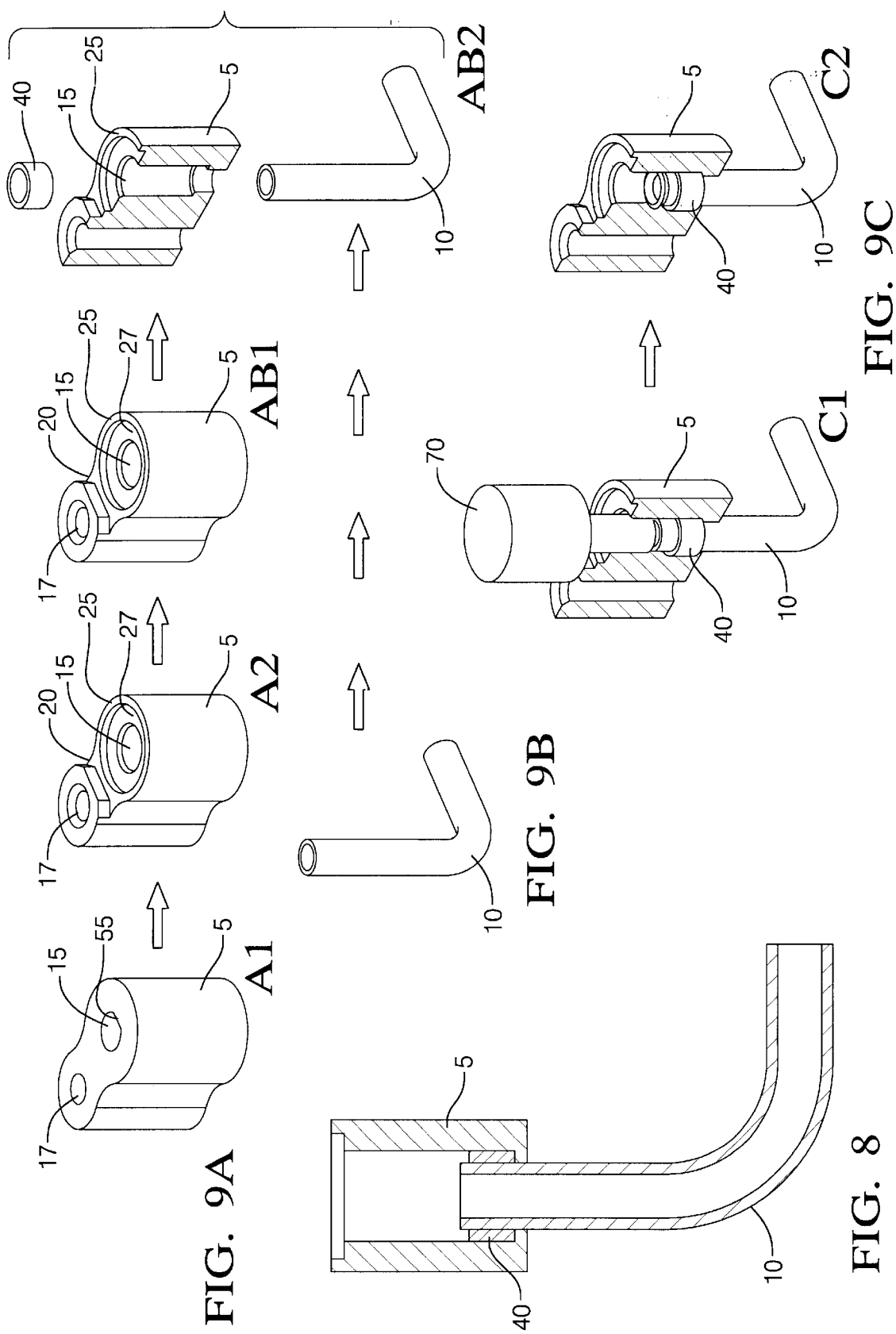

METHOD FOR BRAZING FITTINGS TO PIPES

TECHNICAL FIELD

This invention generally relates to a process for attaching fittings to pipes prior to a brazing operation. With more particularity, this invention relates to the process for attaching fittings to pipes wherein an extruded fitting is machined from opposite sides to allow for inter-engagement with a corresponding fitting on one side and a pipe on the other.

BACKGROUND OF THE INVENTION

Heat exchangers, radiators, evaporators, and condensers are typically manufactured from an alloy that is coated or clad with a thin surface layer of braze material which is then cycled through a braze oven to permanently join the parts together. It is common for pipes to be joined with such parts as, a condenser core utilizing the same braze oven that is used to braze the condenser core. The fittings and pipes are commonly provided, pre-brazed to each other as a pipe and block fitting assembly, by an outside supplier to be used as a component of the larger assembly, such as a condenser unit. It has been found that the originally formed joint between a pipe and a fitting will remelt and solidify, during the condenser core brazing operation. Problems can occur when the brazing alloy flows away from where it was intended and solidifies with less overlapping surface than is ideally desired. This less than desirable braze overlap is often of sufficient strength for the joint to successfully pass a quality check to detect leaks, but the weakened joint may then fail during the installation or attachment process in an assembly plant. It has been suggested to use a higher temperature braze alloy for the pipe to fitting attachment that would tend not to remelt during the condenser brazing operation. However, the fitting materials that are used for their desirable machining properties have a melting temperature that would be close in temperature to the higher melting temperature brazing alloys. Therefore, use of the higher melting temperature brazing alloys is not desirable, as it may cause the fitting itself to melt and lose its integrity during pipe to fitting attachment, prior to passing the pipes through the condenser brazing operation.

Accordingly, it is an object of the present invention to provide a method for maintaining the orientation of fittings to pipes without brazing them prior to a core brazing operation, to provide a geometry in which a strong braze overlap of the pipe to fitting is created in the final assembly braze process, such as the condenser core braze operation, while joint re-melt or deterioration is avoided. It is also an object of the present invention to provide a method of brazing fittings to pipes such that the orientation of the fitting and pipes can be maintained without the use of complicated brazing fixtures.

SUMMARY OF THE INVENTION

There is provided a process which cures those deficiencies outlined above and provides a reliable means to assure a quality fitting to pipe joint, as well as maintain the proper orientation of the parts. The process includes providing an extruded fitting which has a bore formed by the extrusion process extending from a first surface to a second surface, where the axis of the bore is approximately perpendicular to both of the first and second surfaces. The bore is then machined in both directions along the axis of the bore. The bore is machined from the first surface along the axis to form a ledge that will interact with a corresponding fitting. The bore is machined from a direction from the second surface along the axis for a distance that is less than the entire length of the bore, to provide a stop. A pipe having a braze collar placed circumferentially thereon is then inserted into the extruded fitting in a direction from the second surface to inter-engage the collar and the stop. The pipe and collar is then expanded using a mandrel to conform the shape of the pipe and collar to the bore. The assembled fitting is then brazed in a furnace to permanently attach the pipe to the extruded fitting.

BRIEF DESCRIPTION OF THE DRAWINGS

The various advantages of the present invention will become apparent to one skilled in the art by reading the following specification and claims and by referencing the following drawings in which:

FIG. 7 is an assembly diagram detailing the various steps of the process;

FIG. 8 is a sectional view of an alternative embodiment of the fitting and pipe; and FIG. 9 is an assembly diagram of an alternative embodiment detailing the various steps of the process.

DESCRIPTION OF THE PREFERRED EMBODIMENT

Figure 1:
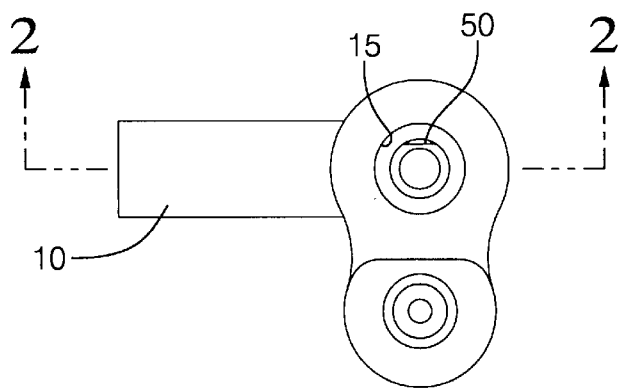
FIG. 1 is a plan view of the fitting and pipe.
Figure 2:
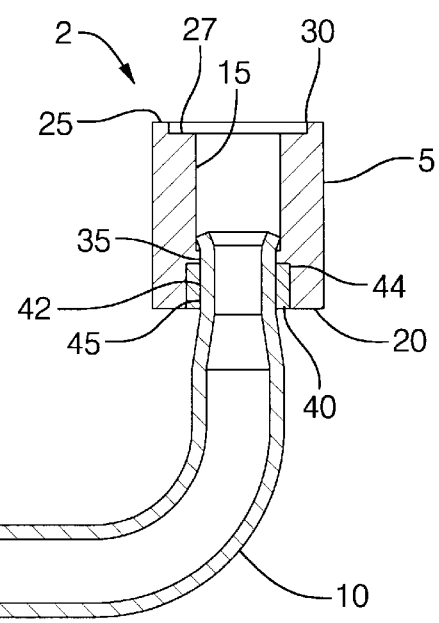
FIG. 2 is a sectional view of the fitting and pipe.
Figure 5:
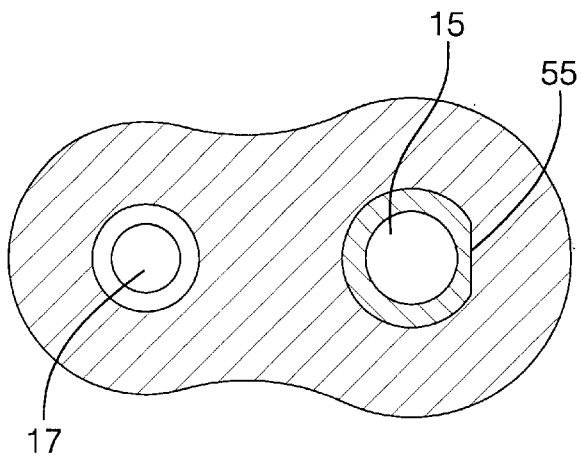
FIG. 5 is a sectional view of the fitting and pipe.

Referring to FIG. 2, there is shown an assembled pipe and block fitting assembly 2 for use on an air conditioning condenser. The fitting assembly 2 has two major components: an extruded/machined fitting 5, and a pipe 10. The fitting 5 has a bore 15 formed therein extending from a first surface 25 to a second surface 20 approximately perpendicular to the first and second surfaces. As best seen in FIGS. 1 and 5, the bore has an irregularity 55 extruded therein to provide an anti-rotation and location feature. The irregularity as shown in FIG. 5 is a flattened area on an otherwise circular bore. It is to be understood that other irregularities, such as multi-faceted surfaces may also be used by the present invention without departing from the inventive aspect of the device.

Figure 6:
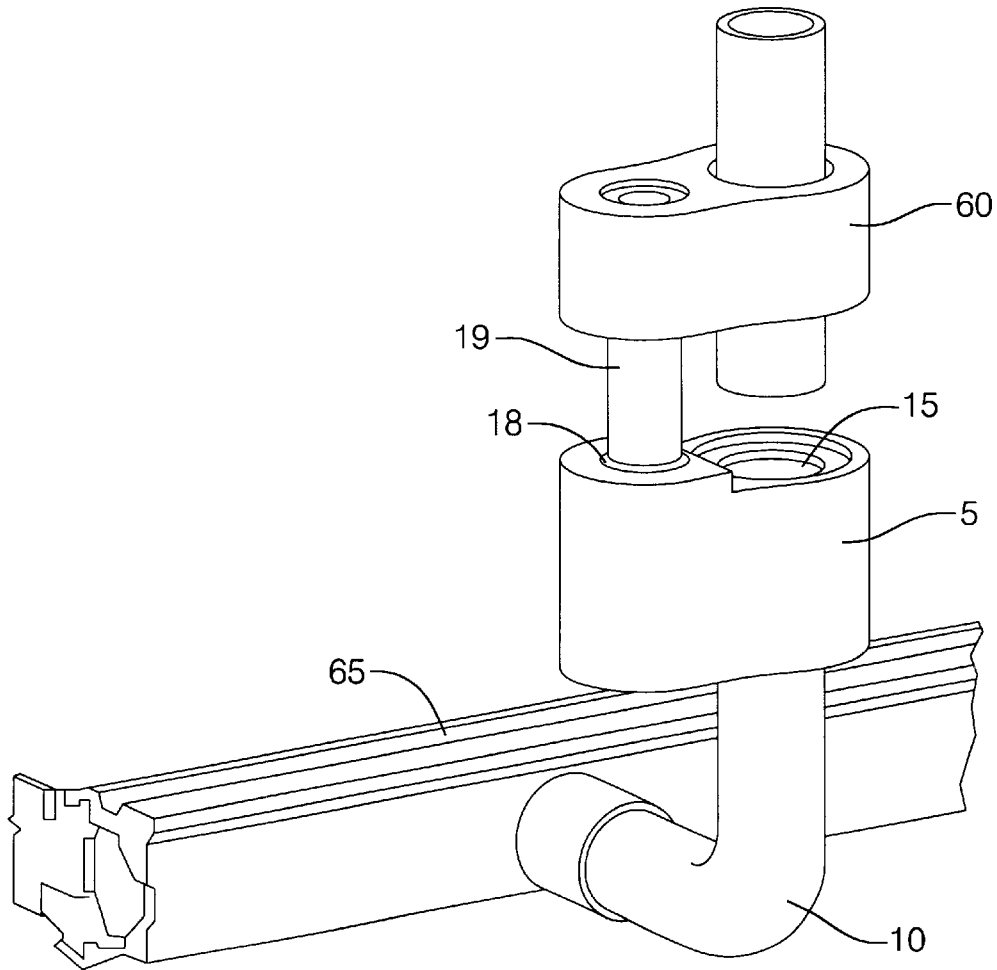
FIG. 6 is a environmental view showing the fitting and pipe in relation to a condenser core and a mating block fitting.

The extruded fitting 5, as shown in FIGS. 1—6, has a second bore 17 formed therein for mating with a corresponding fitting 60, as shown in FIG. 6. The second bore 17 may receive a threaded stud 19 on which the corresponding fitting 60 may be secured. The second bore 17 may or may not be included with the extruded fitting 5 of the present invention.

In a preferred embodiment and with reference to FIG. 2, the extruded fitting 5 is machined in a direction along the axis of the bore 15 from both the first and second surfaces 25 and 20 respectively. As can be seen, the machined area from the direction of the first surface 25 forms a ledge 27 that interacts with a corresponding fitting 60 as can be seen in FIG. 6. There may also be included a seal washer (not shown) that sits on the ledge 27 and interacts with ledge 27 and the corresponding fitting 60 to provide a seal. The extruded fitting 5 is also machined in a direction from the second surface 20 along the axis of the bore 15 for a distance less than the entire length of the bore 15 to provide a stop 35.

In an alternative embodiment and with reference to FIG. 9, the extruded fitting 5 is machined in a direction along the axis of the bore 15 from the first surface 25. The fitting 5 is not machined from a second direction. As with the preferred embodiment, the machined area from the direction of the first surface 25 forms a ledge 27 that interacts with a corresponding fitting 60. There may also be included a seal washer (not shown) that sits on the ledge 27 and interacts with ledge 27 and the corresponding fitting 60 to provide a seal.

Figure 3:
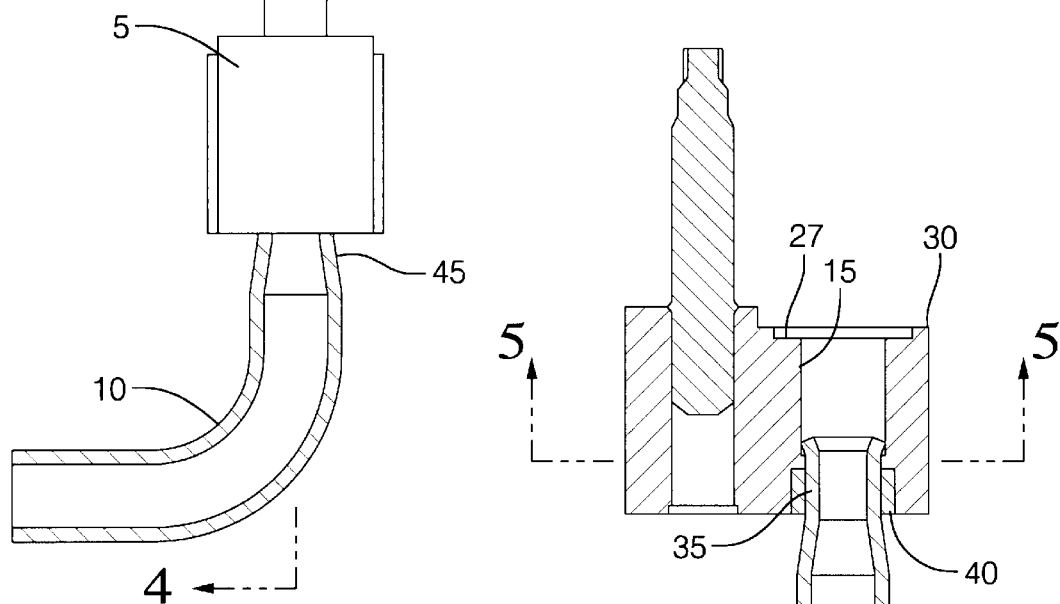
FIG. 3 is a side view of the fitting and pipe.
Figure 4:
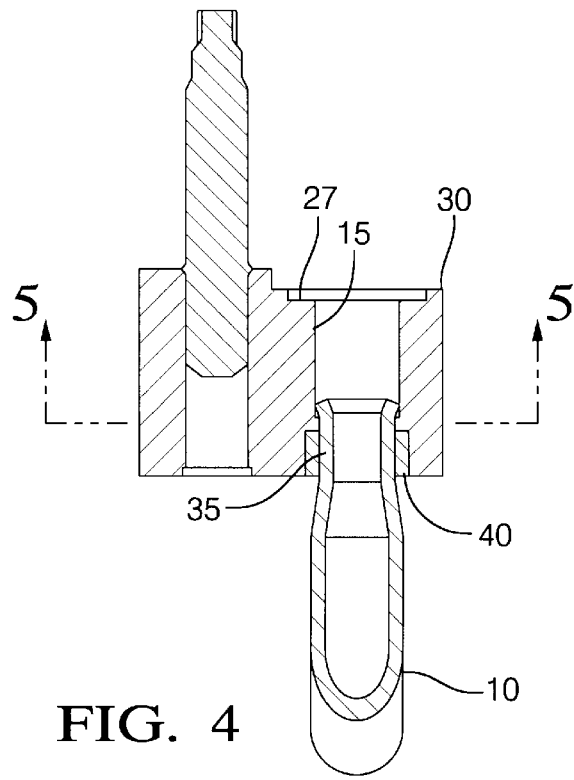
FIG. 4 is a sectional view of the fitting and pipe.

With reference to FIGS. 2 and 3, in a first embodiment the pipe 10 has a necked portion 45 over which a braze sleeve 40 is placed circumferentially around. The necked portion 45 provides a means for locating the braze sleeve 40 around the pipe 10 and allows for insertion of the pipe 10 into the fitting 5.

In an alternative embodiment, shown in FIG. 8, a bead or skive may be utilized by the present invention to locate the braze sleeve 40 on the pipe 10.

In a preferred embodiment, the pipe 10, as best shown in FIG. 1, has a corresponding irregularity 50 formed thereon to interact with the irregularity 55 extruded on the bore 15 of the extruded fitting 5. As the pipe 10 and extruded fitting 5 are mated, the irregularity 55 on the bore 15 and the irregularity 50 on the pipe 10 interact to provide an anti-rotation and location feature.

In an alternative embodiment, the pipe 10 would not have an irregularity 50 formed thereon. The pipe 10 would have a diameter sized such that it would be capable of insertion into the extruded fitting 5 past the irregularity 55. In a step to be further described below, the mandrel 70 would then expand the pipe 10 into the irregularity 55, thereby locking the orientation of the components.

The braze sleeve 40 may be a solid clad material, meaning the braze sleeve comprises a solid braze alloy material. Preferably, the braze sleeve comprises a layered clad material. With this orientation the layered clad material would comprise a clad material placed over a base material wherein the clad material is on both the interior surface 42 of the braze sleeve that corresponds to the pipe 10 as well as the exterior surface 44 which interacts with the extruded fitting 5. Such an orientation of layered clad material would place the brazed material over a large contact area without relying upon capillary action. The layered clad material would also provide tight braze tolerances over a large area, whereas applying plain clad material over a comparable area, in such a way as to be maintained over that area through the braze process, would be more difficult.

In a preferred embodiment and with reference to FIGS. 7A, B, and C there is shown the process for assembling fittings to pipes of the preferred embodiment of the present invention. As can be seen in step A1 the extruded fitting 5 is formed having a bore 15 formed therein including an irregularity 55. With reference to step A2 the extruded fitting 5 is machined from both the first surface 25 and second surface 20 to provide both a stop 35 for the pipe and a ledge 27 to mate with a corresponding fitting 60. With reference to step B1 and B2 the pipe 10 is necked down and the irregularity 50 is added to provide the location and anti-rotation feature. With reference to step B3, the braze sleeve 40 is placed over the pipe 10 and is located by the necked down portion 45. With reference to Steps AB1 and AB2, the pipe 10 is then inserted into the extruded fitting 5 where it interacts with the stop 35 formed by the machining process from the second surface 25. The sleeve 40 and stop 35 interact to provide a location for the depth of insertion of the pipe. Again, both the extruded fitting 5 and pipe 10 have irregularities 55, 50 respectively formed thereon that correspond so that the pipe 10 and extruded fitting 5 are held in a loose fit until a mandrel 70 (see step C1 below) expands the pipe 10 into the fitting 5. This design allows for the insertion of the pipe 10 in a manner to provide a means for maintaining a desired orientation of the pipe 10 and the extruded fitting 5. With reference to FIG. 7C and step C1, after the pipe 10 has been inserted into the extruded fitting 5 a mandrel 70 is used to deform the pipe 10 and sleeve 40 to the shape of the bore 15 formed within the extruded fitting 5. With reference to step C2, the pipe 10 and sleeve 40 after being deformed are positively located in the extruded fitting 5 and may be brazed with a condenser core 65, as depicted in FIG. 6. The pipe 10 and extruded fitting 5 may be brazed in a braze furnace without the use of complicated fixtures.

In an alternative embodiment and with reference to FIGS. 9A, B and C, there is shown the process for assembling fittings to pipes of the alternative embodiment of the present invention. As can be seen in step A1 the extruded fitting 5 is formed having a bore 15 formed therein including an irregularity 55. With reference to step A2 the extruded fitting 5 is machined from the first surface 25 to provide a ledge 27 to mate with a corresponding fitting 60. With reference to step B1 and B2 the pipe 10 is necked down and the irregularity 50 is added to provide the location and anti-rotation feature. With reference to Step AB1, the pipe 10 is then inserted into the extruded fitting 5. Again, both the extruded fitting 5 and pipe 10 have irregularities 55, 50 respectively formed thereon that correspond so that the pipe 10 and extruded fitting 5 are held in a loose fit until a mandrel 70 (see step C1 below) expands the pipe 10 into the fitting 5. This design allows for the insertion of the pipe 10 in a manner to provide a means for maintaining a desired orientation of the pipe 10 and the extruded fitting 5. With reference to step AB2, the braze sleeve 40 is then placed over the pipe 10 from a direction of the first surface 25 and is located by the necked down portion 45. With reference to FIG. 9C and step C1, after the pipe 10 has been inserted into the extruded fitting 5 and the braze sleeve 40 has been placed circumferentially around the pipe 10, a mandrel 70 is used to deform the pipe 10 and sleeve 40 to the shape of the bore 15 formed within the extruded fitting 5. With reference to step C2, the pipe 10 and sleeve 40 after being deformed are positively located in the extruded fitting 5 and may be brazed with a condenser core 65, as depicted in FIG. 6.

While a preferred embodiment is disclosed, a worker in this art would understand the various modifications that come within the scope of the invention. Thus, the following claims should be studied to determine the true scope and content of this invention.

What is claimed is:

1. A process for attaching fittings to pipes for subsequent brazing comprising:

a) providing an extruded fitting having a first surface and second surface, said first surface being located opposite said second surface; and b) at least one extruded bore formed in said extruded fitting extending from said first surface to said second surface along an axis approximately perpendicular to said first and second surfaces;

c) machining said bore in a direction from said first surface along said axis of said bore to from a ledge to interact with a corresponding fitting;

d) machining said bore in a direction from said second surface along said axis of said bore for a distance such that the addition of the two machining steps together is less than the entire length of said bore for providing a stop;

e) providing a pipe having a braze sleeve placed circumferentially thereon;

f) inserting said pipe having said braze sleeve into said extruded fitting in a direction from said second surface to inter-engage said sleeve and said stop;

g) expanding said pipe and said sleeve using a mandrel to conform said pipe and said sleeve to a shape of said bore;

h) brazing said fitting in a furnace to permanently attach said pipe to said extruded fitting.

2. The process of claim 1, further including the step of forming an irregularity in said extruded bore for providing an anti-rotation and location feature.

3. The process of claim 2, further including the step of forming an irregularity on said pipe to correspond with said irregularity formed on said extruded bore.

4. The process of claim 1, including the step of pre-flux coating said braze sleeve.

5. The process of claim 1, including the step of forming a necked portion on said pipe on an end thereof for providing a stop for said braze sleeve.

6. The process of claim 1, including the step of forming a bead or skive on said pipe on an end thereof for providing a stop for said braze sleeve.

7. The process of claim 1, including the step of providing said braze sleeve and wherein said braze sleeve is a solid clad material.

8. The process of claim 1, including the step of providing said braze sleeve and wherein said braze sleeve is a layered clad material.

9. The process of claim 8, including the step of providing said braze sleeve and wherein said braze sleeve has a layered clad material comprising a clad material placed over a base material.

10. A process for attaching fittings to pipes for subsequent brazing comprising:

a) providing an extruded fitting having a first surface and second surface, said first surface being located opposite said second surface; and b) at least one extruded bore formed in said extruded fitting extending from said first surface to said second surface along an axis approximately perpendicular to said first and second surfaces;

c) machining said bore in a direction from said first surface along said axis of said bore to from a ledge to interact with a corresponding fitting, said machining along said axis of said bore extending for a distance less than the entire length of said bore for providing a stop;

d) providing a pipe;

e) inserting said pipe into said extruded fitting in a direction from said second surface;

f) placing a braze sleeve around said pipe;

g) expanding said pipe and said sleeve using a mandrel to conform said pipe and said sleeve to a shape of said bore;

h) brazing said fitting in a furnace to permanently attach said pipe to said extruded fitting.

11. The process of claim 10, further including the step of forming an irregularity in said extruded bore for providing an anti-rotation and location feature.

12. The process of claim 11, further including the step of forming an irregularity on said pipe to correspond with said irregularity formed on said extruded bore.

13. The process of claim 10, including the step of pre-flux coating said braze sleeve.

14. The process of claim 10, including the step of forming a necked portion on said pipe on an end thereof for providing a stop for said braze sleeve.

15. The process of claim 10, including the step of forming a bead or skive on said pipe on an end thereof for providing a stop for said braze sleeve.

16. The process of claim 10, including the step of providing said braze sleeve and wherein said braze sleeve is a solid clad material.

17. The process of claim 10, including the step of providing said braze sleeve and wherein said braze sleeve is a layered clad material.

18. The process of claim 17, including the step of providing said braze sleeve and wherein said braze sleeve has a layered clad material comprising a clad material placed over a base material.

19. A fitting setting comprising:

a) an extruded fitting member having a first bore formed therein, said bore extending from a first surface to a second surface approximately perpendicular to said first and second surfaces, said bore having a first irregularity formed therein, said extruded fitting member being machined from at least one direction along an axis of said bore;

b) a pipe inserted into said bore and operably engaging said extruded fitting member; and c) a braze sleeve in circumferential engagement with said pipe and further engaging said extruded fitting member.

20. The fitting assembly of claim 19, wherein said extruded fitting member has a second bore formed therein.

21. The fitting assembly of claim 19, wherein said pipe has a cooperating second irregularity formed therein for mating with said first irregularity formed on said extruded fitting member.

22. The fitting assembly of claim 19, wherein said pipe is necked down for providing a stop for said braze sleeve.

23. The fitting assembly of claim 19, wherein said extruded fitting member is machined in both directions along said axis of said bore.

24. The fitting assembly of claim 23, wherein said fitting is machined from said first surface along said axis of said bore for providing the ledge to interact with a corresponding fitting.

25. The fitting assembly of claim 23, wherein said extruded fitting member is machined from said second surface along said axis of said bore for providing a stop for said pipe.

26. The fitting assembly of claim 19, wherein said braze sleeve is pre-flux coated.

27. The fitting assembly of claim 19, wherein said pipe includes a bead or skive formed thereon for providing a stop for said braze sleeve.

28. The fitting assembly of claim 19, wherein said braze sleeve is a solid clad material.

29. The fitting assembly of claim 19, wherein said braze sleeve is a layered clad material.

30. The fitting assembly of claim 29, wherein said layered clad material comprises a clad material placed over a based material.

* * * * *